US010555181B2

(12) United States Patent
Conforti

(10) Patent No.: US 10,555,181 B2
(45) Date of Patent: Feb. 4, 2020

(54) DETERMINING TRANSCEIVER HEIGHT

(71) Applicant: ARRIS Enterprises LLC, Suwanee, GA (US)

(72) Inventor: Maor Conforti, Zichron Yaakov (IL)

(73) Assignee: Arris Enterprises, LLC, Suwanee, GA (US)

( * ) Notice: Subject to any disclaimer, the term of this patent is extended or adjusted under 35 U.S.C. 154(b) by 150 days.

(21) Appl. No.: 15/969,073

(22) Filed: May 2, 2018

(65) Prior Publication Data

US 2018/0324598 A1 Nov. 8, 2018

Related U.S. Application Data

(60) Provisional application No. 62/501,088, filed on May 3, 2017.

(51) Int. Cl.
| | | |
|---|---|---|
| *G06K 9/00* | (2006.01) | |
| *H04W 16/20* | (2009.01) | |
| *G06T 7/60* | (2017.01) | |
| *H04W 64/00* | (2009.01) | |
| *H04W 24/02* | (2009.01) | |

(52) U.S. Cl.
CPC ............... *H04W 16/20* (2013.01); *G06T 7/60* (2013.01); *H04W 64/003* (2013.01); *G06T 2207/20092* (2013.01); *H04W 24/02* (2013.01)

(58) Field of Classification Search
CPC .......................................... G06T 2207/20092
See application file for complete search history.

(56) References Cited

U.S. PATENT DOCUMENTS

| | | | | |
|---|---|---|---|---|
| 6,912,293 B1* | 6/2005 | Korobkin | ................ | G06T 15/20 345/420 |
| 8,996,336 B2 | 3/2015 | Malka et al. | | |
| 9,041,796 B2 | 5/2015 | Malka et al. | | |
| 9,151,608 B2 | 10/2015 | Malka et al. | | |
| 9,679,227 B2* | 6/2017 | Taylor | ..................... | G06T 7/187 |
| 10,068,373 B2* | 9/2018 | Lee | ..................... | G06F 3/04815 |
| 2009/0067725 A1* | 3/2009 | Sasakawa | .............. | G01C 11/04 382/190 |
| 2013/0060540 A1* | 3/2013 | Frahm | ..................... | G06T 15/06 703/2 |
| 2017/0116707 A1* | 4/2017 | Upendran | ........... | G06F 17/5004 |

* cited by examiner

Primary Examiner — Oneal R Mistry
(74) *Attorney, Agent, or Firm* — Steven Stupp

(57) ABSTRACT

An electronic device that determines a height of a transceiver in a structure is described. During operation, the electronic device acquires an image of the structure. Then, the electronic device receives user-input information that specifies lines on the surface of the structure, and receives second user-input information that specifies an approximate vertical location on an exterior of the structure of a transceiver in the structure. Moreover, the electronic device obtains a second image from above the structure from an imaging service, and receives third user-input information that specifies at least one of the lines on the surface in the second image. Next, the electronic device provides information to the imaging service, and in response receives a distance between end points of at least one of the lines. Furthermore, the electronic device provides second information to a computer, and in response receives the determined height of the transceiver.

20 Claims, 6 Drawing Sheets

DETERMINING TRANSCEIVER HEIGHT

CROSS-REFERENCE TO RELATED APPLICATION

This application claims the benefit of U.S. Provisional Patent Application No. 62/501,088, filed May 3, 2017.

BACKGROUND

Field

The described embodiments relate to techniques for determining spatial information. In particular, the described embodiments relate to techniques for determining a height of a transceiver in a building or structure.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

While many electronic devices communicate with each other via large networks owned by a network operator, it is often difficult to communicate via a cellular-telephone network, e.g., in high density or crowded environments. In particular, in crowded environments the network performance (such as the block error rate and the capacity) of the cellular-telephone network can be degraded. Moreover, there are often constraints on the number of cellular-telephone towers. Consequently, it can be difficult for the operator of the cellular-telephone network to improve the quality of their service, e.g., in crowded environments.

One approach for improving the quality of service in a cellular-telephone network is to install and operate local transceivers that operate at lower transmit power than the cellular-telephone towers, and that provide communication in the cellular-telephone network over shorter ranges than the cellular-telephone towers.

However, in order to ensure proper operation, during installation the geographic location of a local transceiver often needs to be specified. In particular, the spatial coordinates of the transceiver may need to be determined and provided to the cellular-telephone network. While the latitude and longitude can usually be determined, in practice, it is often more challenging to determine the height, z. This is especially the case when the transceiver is installed in a multi-story building. The difficulty in determining the height of the transceiver makes the installation process more complicated and time-consuming.

SUMMARY

The described embodiments relate to an electronic device that determines a height of a transceiver in a structure. This electronic device includes: an imaging sensor that acquires one or more images, an interface circuit that communicates with other electronic devices, a display that displays information, a processor that executes a program module, and memory that stores the program module. During operation, the electronic device acquires, using the imaging sensor, an image of a surface of a structure, and displays the image on the display. Then, the electronic device receives user-input information that specifies a first line and a second line on the surface of the structure, where the first line and the second line are vertically offset from each other. Moreover, the electronic device receives second user-input information that specifies an approximate vertical location on an exterior of the structure of a transceiver in the structure.

Next, using the interface circuit, the electronic device provides a query to an imaging service for a second image of the structure, and receives the second image from the imaging service, where the second image includes a view of the structure from a position above the structure. The electronic device displays the second image on the display, and receives third user-input information that specifies at least one of the first line and the second line on the surface in the second image. Furthermore, using the interface circuit, the electronic device provides, based on the third user-input information, information that specifies at least locations of end points of at least one of the first line and the second line to the imaging service, and receives a distance between the end points from the imaging service. Additionally, using the user interface circuit, the electronic device provides, to a computer, the distance, the approximate vertical location and a geometry of the first line and a second line, and receives the determined height of the transceiver from the computer.

In some embodiments, the electronic device transmits the determined height to the transceiver.

Moreover, the first line and the second line may be horizontal lines with slopes of zero. Furthermore, pairs of end points of the first line and the second line may be vertically aligned.

Additionally, the image may include a two-dimensional view of the structure. For example, the view may include an oblique perspective of the structure that includes two surfaces of the structure.

Note that the first line and the second line may at least partially overlap in the second image.

Moreover, the query may include a location of the structure.

Furthermore, the height may have an uncertainty that is less than a predefined value.

Another embodiment provides a computer-readable storage medium with a program module for use with the electronic device. When executed by the electronic device, this program module causes the electronic device to perform at least some of the aforementioned operations.

Another embodiment provides a method, which may be performed by the electronic device. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An electronic device that determines a height of a transceiver in a structure (such as a building) is described. During operation, the electronic device acquires an image of the structure. Then, the electronic device receives user-input information that specifies lines on the surface of the structure, and receives second user-input information that specifies an approximate vertical location on an exterior of the structure of a transceiver in the structure. Moreover, the electronic device obtains a second image from above the structure from an imaging service, and receives third user-input information that specifies at least one of the lines on the surface in the second image. Next, the electronic device provides information to the imaging service, and in response receives a distance between end points of at least one of the lines. Furthermore, the electronic device provides second information to a computer, and in response receives the determined height of the transceiver.

By determining the height of the transceiver, this measurement technique may simplify installation of the transceiver in the structure. In the process, the measurement technique may reduce the time and the cost needed to install the transceiver. Consequently, the measurement technique may facilitate improved communication in a network (such as a cellular-telephone network), and thus may improve the user experience when installing the transceiver and/or when communicating information via the network.

In the discussion that follows, the electronic device communicates frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, a packet or frame-based communication protocol is used as an illustrative example. However, a wide variety of communication protocols may be used, such as Long Term Evolution or LTE (from the 3rd Generation Partnership Project of Sophia Antipolis, Valbonne, France) another cellular-telephone communication protocol, etc. Thus, in some embodiments the transceivers include eNode-Bs or eNBs.

Moreover, an access point may communicate with other access points and/or computers in a network using a wireless communication protocol (such as Wi-Fi), or a wired communication protocol, such as an IEEE 802.3 standard (which is sometimes referred to as 'Ethernet') and/or another type of wired interface. In the discussion that follows, Wi-Fi and Ethernet are used as illustrative examples.

Figure 1:
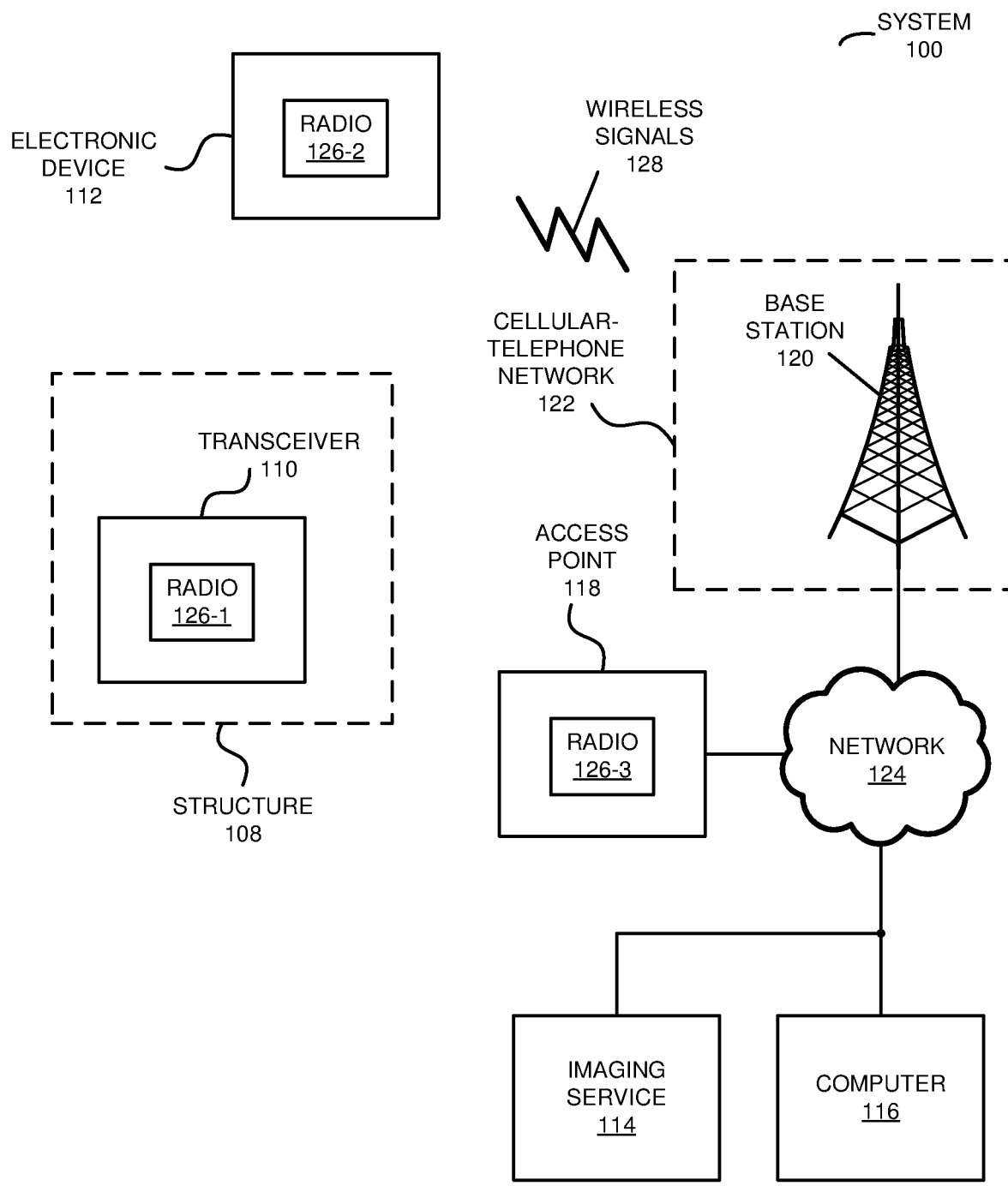
FIG. 1 is a block diagram illustrating communication among electronic devices in accordance with an embodiment of the present disclosure.

FIG. 1 presents a block diagram illustrating an example of a system 100 with communication among transceiver 110, electronic device 112 (such as a cellular telephone), imaging service 114, computer 116, optional access point 118 and optional base station 120 in cellular-telephone network 122 in accordance with some embodiments. In particular, electronic device 112 may communicate with transceiver 110, optional access point 118 and/or optional base station 120 using wireless communication, and optional access point 118 may communicate with transceiver 110, imaging service 114, computer 116 and/or optional base station 120 using wireless and/or wired communication. Moreover, note that optional access point 118 may include a physical access point and/or a virtual access point that is implemented in software in an environment of an electronic device or a computer.

The wired communication among transceiver 110, imaging service 114, computer 116, optional access point and/or optional base station 120 may occur via network 124 (such as an intra-net, a mesh network, point-to-point connections and/or the Internet) and may use a network communication protocol, such as Ethernet. (While FIG. 1 illustrates system 100 including network 124, in other embodiments network 124 is external to system 100.) Moreover, the wireless communication using Wi-Fi may involve: transmitting advertising frames or packets on wireless channels, detecting one another by scanning wireless channels, establishing connections (for example, by transmitting association or attach requests), and/or transmitting and receiving frames or packets (which may include the association requests and/or additional information as payloads). In some embodiments, the wireless communication among transceiver 110, electronic device 112, optional access point 118 and/or optional base station 120 also involves the use of dedicated connections, such as via a peer-to-peer (P2P) communication technique.

Figure 7:
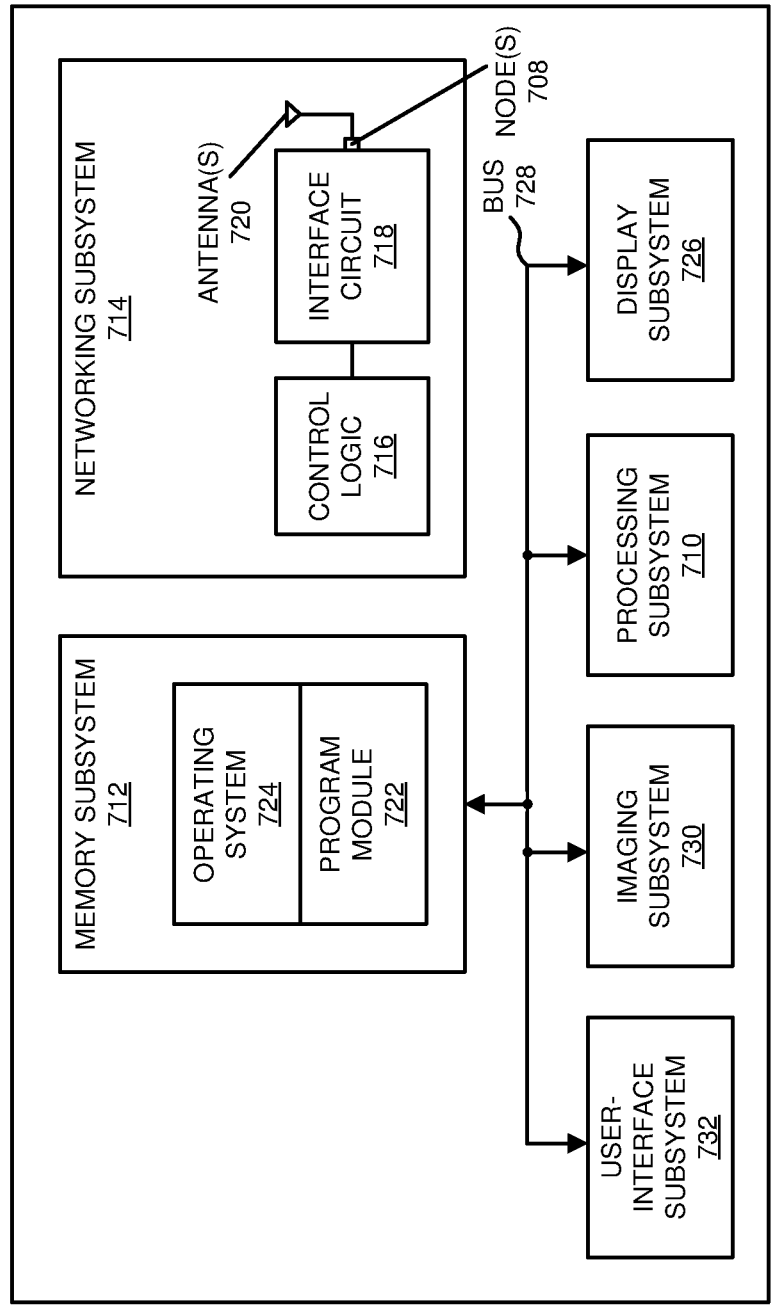
FIG. 7 is a block diagram illustrating an electronic device in accordance with an embodiment of the present disclosure.

As described further below with reference to FIG. 7, transceiver 110, electronic device 112, imaging service 114, computer 116, optional access point 118 and/or optional base station 120 may include subsystems, such as a networking subsystem, a memory subsystem and a processor subsystem. In addition, transceiver 110, electronic device 112, optional access point 118 and/or optional base station 120 may include radios 126 in the networking subsystems. More generally, transceiver 110, electronic device 112 and/or optional access point 118 can include (or can be included within) any electronic devices with the networking subsystems that enable transceiver 110, electronic device 112 and/or optional access point 118 to communicate with each other or other components in system 100 using wireless and/or wired communication. This wireless communication can comprise transmitting advertisements on wireless channels to enable transceiver 110, electronic device 112 and/or optional access point 118 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 126 are shown in transceiver 110, electronic device 112, optional access point 118 and optional base station 120 in FIG. 1, one or more of these instances may be different from the other instances of radios 126.

As can be seen in FIG. 1, wireless signals 128 (represented by a jagged line) are transmitted from radio 126-2 in electronic device 112. These wireless signals may be received by radio 126-3 in optional access point 118. In particular, electronic device 112 may transmit frames or packets. In turn, these frames or packets may be received by optional access point 118. Moreover, optional access point 118 may allow electronic device 112 to communicate with other electronic devices, computers and/or servers via network 124.

Note that the communication among transceiver 110, electronic device 112, optional access point 118 and/or optional base station 120 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in transceiver 110, electronic device 112, optional access point 118 and/or optional base station 120 includes: receiving wireless signals 128 with the packet or frame; decoding/extracting the packet or frame from received wireless signals 128 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

A cellular-telephone network (such as cellular-telephone network 122) may include base stations (such as optional base station 120) and associated cell towers that implement so-called 'macrocells.' These macrocells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macrocells. Small cells are generally radio access nodes (which, in the discussion that follows, are sometimes referred to as 'transceivers' or 'radio nodes') providing lower power than macrocells and therefore providing smaller coverage areas than macrocells. It is common to subcategorize 'small cells' even further by ascribing relative general ranges. For example, a 'microcell' might have a range of less than 2 kilometers, a "picocell" less than 200 meters, and a 'femtocell' on the order of 10 meters. These descriptions are for general relative comparison purposes and should not be limiting on the scope of the embodiments.

However, there are often gaps in the coverage offered by macrocells. Consequently, some users operate local transceivers that provide short-range communication in the cellular-telephone network. These so-called 'femto cells' provide short-range communication (e.g., up to 10 m) for a few individuals.

In addition, larger organizations (such as those with 50-60 users) may operate local transceivers that provide communication in the cellular-telephone network over a range of 100 m. This intermediate-range coverage in the cellular-telephone network can be typically referred to as a 'small cell' as well.

One challenge for operators of cellular-telephone networks is maintaining network performance and quality. For example, it may be difficult to maintain the network performance and the quality of service in high density or crowded environments. While the use of femto cells and/or small cells can mitigate this challenge, as discussed previously it can be time-consuming and expensive to correctly install the transceivers in the femto cells and/or small cells. In particular, it can be difficult to determine the spatial coordinates of a transceiver, such as the height z in a structure or building.

In order to address this challenge, the measurement technique may assist a user in determining the height of transceiver 110 in a structure 108. In particular, as described below with reference to FIGS. 2-6, electronic device 112 may acquire an image of structure 108 (such as building) in which transceiver 110 is installed. For example, a user may use electronic device 112 to acquire a two-dimensional (2D) view of an exterior of structure 108, and electronic device 112 may display the image on a display. As described further below with reference to FIG. 4, this view may include an oblique perspective of structure 108 that includes two surfaces of structure 108. Then, the user may provide user-input information that specifies a first line and a second line on a surface of structure 108, where the first line and the second line are vertically offset from each other. For example, the first line and the second line may be horizontal lines with slopes of zero, and/or pairs of end points of the first line and the second line may be vertically aligned. (However, lines with other slopes and/or that may not be vertically aligned may be used.)

Moreover, the user may provide second user-input information that specifies an approximate vertical location on an exterior of structure 108 of transceiver 110 in structure 108. In some embodiments, the user denotes or marks the first line, the second line and/or the approximate vertical location on the image. For example, the display may include a touch-sensitive display that allows the user to 'draw' the first line, the second line and/or the approximate vertical location on the image.

Next, electronic device 112 may provide a query, via network 124, to imaging service 114 for a second image of structure 108. This query may include a location of structure 108, such as a street address and/or GPS coordinates. In response, imaging service 114 may provide, via network 124, the second image, where the second image includes a view of structure 108 from a position above structure 108. For example, the second image may include a satellite image of structure 108.

Electronic device 112 may display the second image on the display, and the user may provide third user-input information that specifies at least one of the first line and the second line on the surface in the second image. As described further below with reference to FIG. 5, the user may denote or marks the first line and/or the second line on the surface in the second image. Note that the first line and the second line may at least partially overlap in the second image. In embodiments where the second image includes a satellite image of structure 108, the first line and the second line may completely overlap in the second image.

Furthermore, electronic device 112 may provide, via network 124 and based on the third user-input information, information that specifies at least locations of end points of at least one of the first line and the second line to imaging service 114. Using this information, imaging service 114 may calculate a distance between the end points, and may provide, via network 124, information that specifies the distance to electronic device 112.

Additionally, electronic device 112 may provide, via network 124, the distance, the approximate vertical location and a geometry of the first line and a second line to computer 116. Using this information, computer 116 may perform a geometric calculation (such as a 2D geometric calculation) to determine the height of transceiver 110 in structure 108, and may provide, via network 124, information that specifies the determined height to electronic device 112. In some embodiments, electronic device 112 transmits the determined height to transceiver 110. Note the height may have an uncertainty that is less than a predefined value, such as 5-30 cm.

In these ways, the measurement technique may allow the user of electronic device 112 to determine the height of transceiver 110. Then, the user may manually or in automated manner provide the determined height to transceiver 110 and/or cellular-telephone network 122. This spatial coordinate may allow the user to simply and efficiently complete installation of transceiver 110, thereby improving performance of cellular-telephone network 122.

Figure 2:
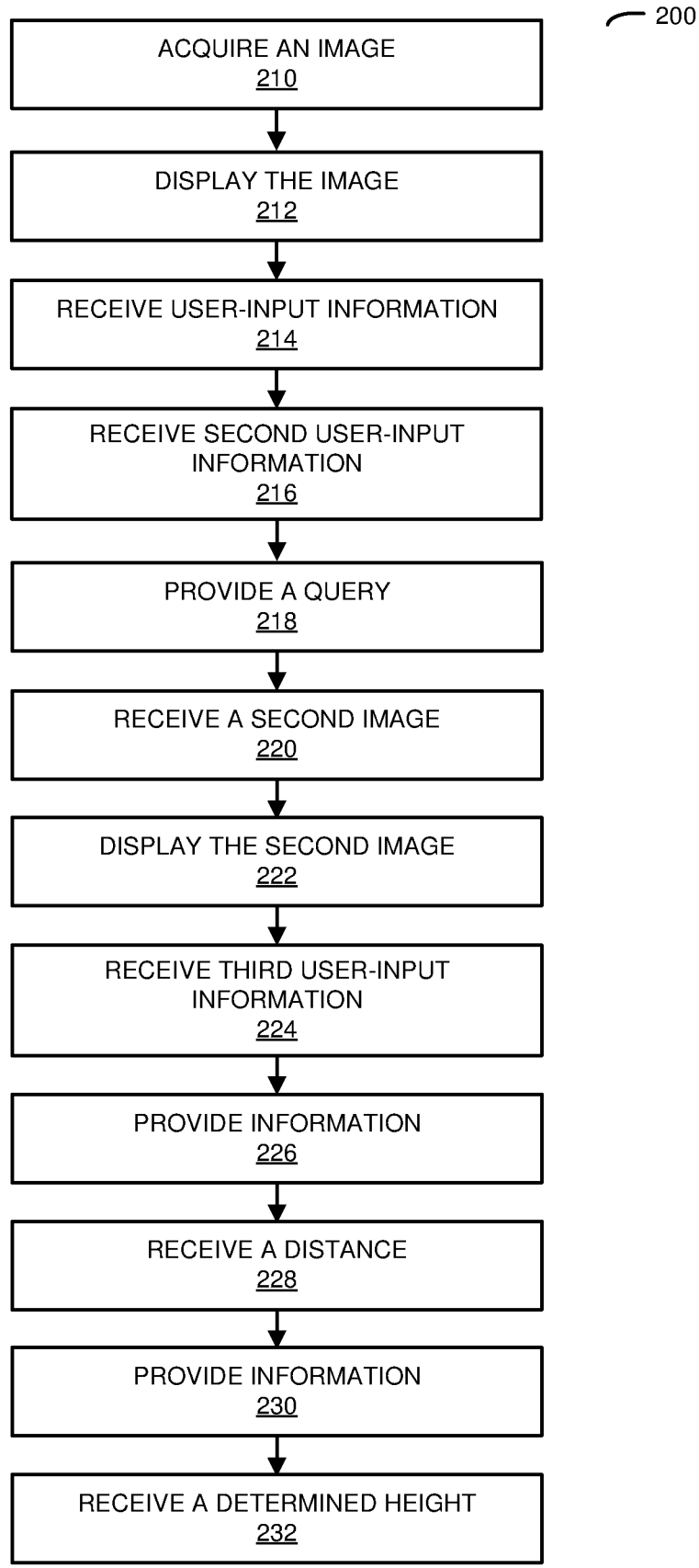
FIG. 2 is a flow diagram illustrating a method for determining a height of a transceiver in the system in FIG. 1 in accordance with an embodiment of the present disclosure.

We now describe embodiments of the method. FIG. 2 presents a flow diagram illustrating an example of a method 200 for determining a height of a transceiver in a structure, which may be performed by an electronic device, such as electronic device 112 in FIG. 1. During operation, the electronic device may acquire, using an imaging sensor, an image (operation 210) of a surface of a structure, and may display the image (operation 212) on a display. For example, the first line and the second line may be horizontal lines with slopes of zero, and/or pairs of end points of the first line and the second line may be vertically aligned. Moreover, the image may include a 2D view of the structure. For example, the view may include an oblique perspective of the structure that includes two surfaces of the structure.

Then, the electronic device may receive user-input information (operation 214) that specifies a first line and a second line on the surface of the structure, where the first line and the second line are vertically offset from each other. Moreover, the electronic device may receive second user-input information (operation 216) that specifies an approximate vertical location on an exterior of the structure of a transceiver in the structure.

Next, using an interface circuit, the electronic device may provide a query (operation 218) to an imaging service for a second image of the structure, and may receive the second image (operation 220) from the imaging service, where the second image includes a view of the structure from a position above the structure. Note that the query may include a location of the structure.

The electronic device may display the second image (operation 222) on the display, and may receive third user-input information (operation 224) that specifies at least one of the first line and the second line on the surface in the second image. Note that the first line and the second line may at least partially overlap in the second image. Furthermore, using the interface circuit, the electronic device may provide, based on the third user-input information, information (operation 226) that specifies at least locations of end points of at least one of the first line and the second line to the imaging service, and may receive a distance (operation 228) between the end points from the imaging service.

Additionally, using the user interface circuit, the electronic device may provide, to a computer, information (operation 230), including the distance, the approximate vertical location and a geometry of the first line and a second line, and may receive the determined height (operation 232) of the transceiver from the computer.

In some embodiments, the electronic device optionally performs one or more additional operations. For example, the electronic device may transmit the determined height to the transceiver. The height may have an uncertainty that is less than a predefined value.

In some embodiments of method 200, there may be additional or fewer operations. Furthermore, the order of the operations may be changed, and/or two or more operations may be combined into a single operation.

Figure 3:
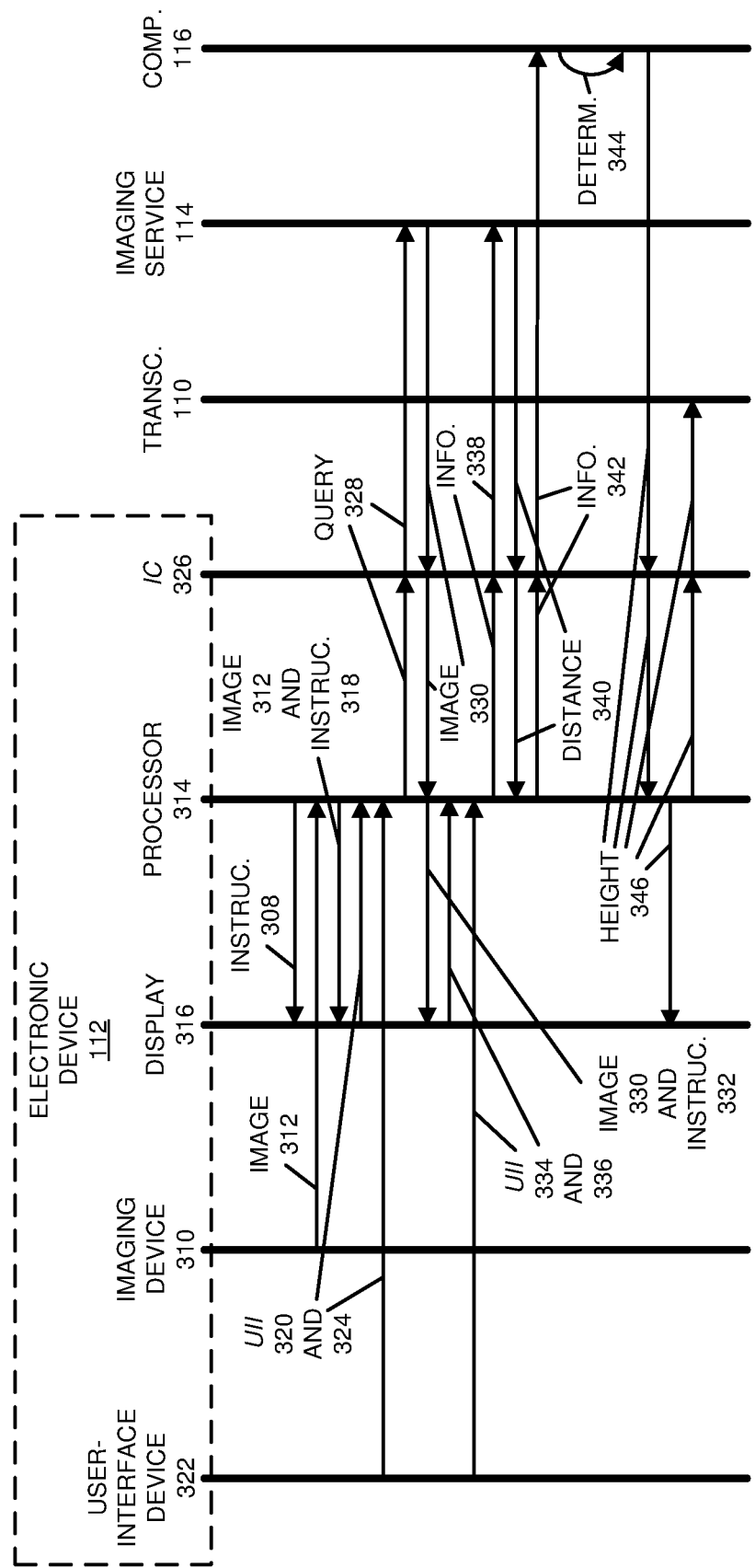
FIG. 3 is a drawing illustrating communication among the electronic devices in FIG. 1 in accordance with an embodiment of the present disclosure.

FIG. 3 presents a drawing illustrating an example of communication among transceiver 110, electronic device 112, imaging service 114 and computer 116. In FIG. 3, electronic device 112 may prompt a user to acquire an image 312, using an imaging sensor 310 (such as a camera, a CMOS imaging sensor, a CCD, etc.) in electronic device 112, of a surface of a structure (such as a 2D view of a building, e.g., an oblique perspective of two sides or surfaces of the building). For example, processor 314 may display an instruction 308 for the user on display 316. In response, the user may use imaging sensor 310 to acquire image 312. Then, processor 314 in electronic device 112 may display image 312 on a display 316 in electronic device, such as a touch-sensitive display. In addition, processor 314 may display instructions 318 for the user of display 316. These instructions may ask the user to specify or define a first line and a second line on the surface of the structure (where the first line and the second line are vertically offset from each other), may ask the user to specify or define an approximate vertical location on an exterior of the structure of transceiver 110 in the structure.

Next, the user may provide user-input information (UII) 320 that specifies or defines the first line and the second line on the surface of the structure. For example, the user may draw the first line and the second line on display 316. Alternatively or additionally, the user may provide user-input information 320 via a user-interface device 322 in electronic device 112 (such as a keyboard, a touchpad, using voice recognition, etc.). Note that the first line and the second line may be horizontal lines with slopes of zero, and/or pairs of end points of the first line and the second line may be vertically aligned in image 312.

Moreover, the user may provide user-input information 324 that specifies or defines the approximate vertical location on the exterior of the structure of transceiver 110 in the structure. For example, the user may draw a mark indicating the vertical location on display 316. Alternatively or additionally, the user may provide user-input information 324 via user-interface device 322.

After receiving user-input information 320 and 324, processor 314 may instruct interface circuit 326 in electronic device 112 to provide a query 328 to an imaging service 114 for an image 330 of the structure. This query may include information that specifies a location of the structure, such as coordinates of the structure (e.g., latitude and longitude, GPS coordinates, etc.). In response, imaging service 114 may provide image 330. Note that image 330 may include a view of the structure from a position above the structure. For example, image 330 may include a satellite image from directly above the structure.

Furthermore, processor 314 may display image 330 on display 316. In addition, processor 314 may display instructions 332 for the user of display 316. These instructions may ask the user to specify or define at least one of the first line and the second line on the surface of the structure.

In response, the user may provide user-input information 334 that specifies or defines at least one of the first line and the second line on the surface in image 330. For example, the user may draw at least one of the first line and the second line on display 316. Alternatively or additionally, the user may provide user-input information 336 via user-interface device 322. Note that the first line and the second line may at least partially overlap in image 330. In particular, when image 330 includes an image from directly above the structure (such as a satellite image), the first line and the second line overlap.

Additionally, processor 314 may instruct interface circuit 326 to provide information 338 that specifies at least locations of end points of at least one of the first line and the second line to imaging service 114. In response, imaging service 114 may provide information that specifies a distance 340 between the end points.

Next, processor 314 may instruct interface circuit 326 to provide, to computer 116, information 342 that specifies distance 340, the approximate vertical location and a geometry of the first line and a second line (such as the end points and/or the slopes). Based on this information, computer 116 may perform a geometric that determines 344 height 346 of transceiver 110, such as the height from ground level or, more generally, from a reference level). Note that height 346 may have an uncertainty that is less than a predefined value, such as 5-30 cm. Then, computer 116 may provide information that specifies height 346 to electronic device 112.

After receiving height 346, processor 314 may provide this information to the user, so that the user can enter it into or provide it to transceiver 110. For example, processor may display height 346 on display 116. Alternatively, processor 314 may instruct interface circuit 326 to provide or transmit information that specifies height 346 to transceiver 110.

While not shown in FIG. 3, electronic device 112 may include memory that is used to store data (such as image 312) and/or one or more program modules.

We now further describe the measurement technique. Authorities often require the exact position of each small cell. This may include the latitude, longitude, and the height from ground level. Latitude and longitude can be determined using a global positioning system, triangulation or trilateration in a network (such as a cellular-telephone network), etc. However, determining the height can be difficult for a user, such as a technician who is installing a small cell. For example, in order to determine or find the height, a user may need to access the entire building plans (as opposed to just the floor plans). This can be time consuming at best, and often the building plans are unavailable.

Using the measurement technique, there is no need for building plans. Instead, the height can be determined using an application (which is sometimes referred to as a 'floor-plan calibration tool') executing on a smartphone. This floor-plan calibration tool is based on a two-operation workflow. In particular, when using the floor-plan calibration tool, a user uploads a building image and calibrates one of its side planes using an imaging service (such as a cloud-based satellite-imaging or a mapping service). Then, the calibrated information is used to determine the heights of one or more small cells in the building.

Figure 4:
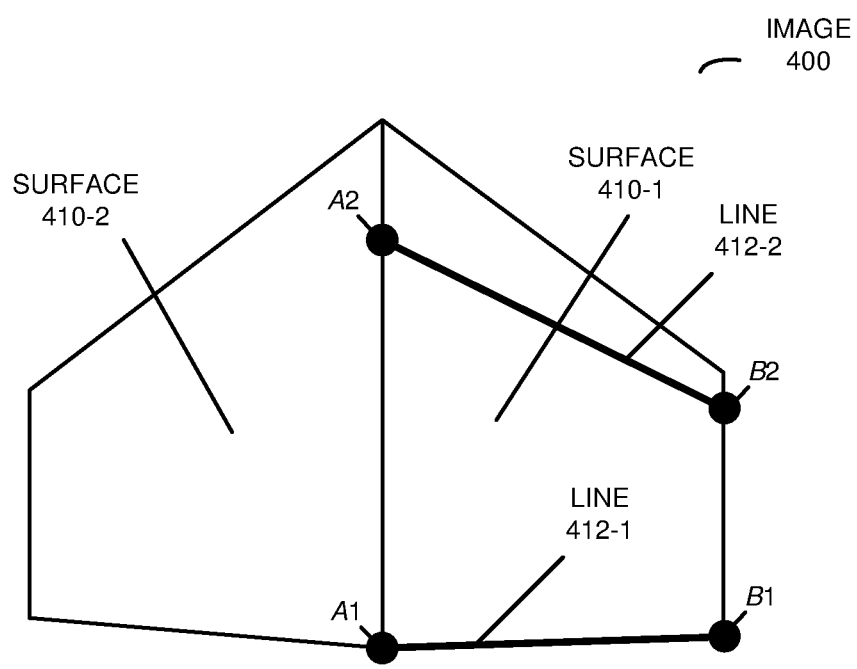
FIG. 4 is a drawing illustrating an image of a structure acquired by an electronic device in the system of FIG. 1 in accordance with an embodiment of the present disclosure.

For example, after installing a small cell on the $4^{th}$ floor of the building, the user may need to determine the height (from the ground) of the small cell. Using the floor-plan calibration tool, the user may calibrate a side plane on the building image. In particular, the user may upload a high-resolution photograph of the building showing a side plane or surface. Note that the photograph can be taken from a variety of directions or vantage points, so long as it includes at least one side of the building. This is illustrated in FIG. 4, which presents a drawing illustrating an example of image 400 of a structure acquired by electronic device 112 in FIG. 1.

In particular, image 400 includes two external sides or surfaces 410 of the building. In image 400, two horizontal lines 412 on side 410-1 may be indicated by the user. For example, line 412-1 (with endpoints A1 and B1) is at the bottom of the ground floor and line 412-2 (with endpoints A2 and B2) is at a high floor or at the roof line. Moreover, lines 412 both end on the same edges of the building. Consequently, endpoint A2 may be exactly vertically above endpoint A1, and endpoint B2 may be exactly vertically above endpoint B1. Note that the user may have drawn lines 412, such as by zooming in on image 400.

Figure 5:
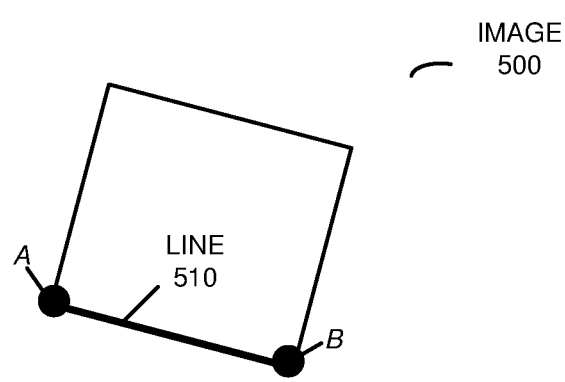
FIG. 5 is a drawing illustrating an image of a structure provided by an imaging service in the system of FIG. 1 in accordance with an embodiment of the present disclosure.

Next, the user may obtain an image of the structure from an imaging service. This is shown in FIG. 5, which presents a drawing illustrating an image 500 of a structure provided by imaging service 114 in FIG. 1. For example, image 500 of the building may be acquired or obtained by electronic device from an imaging service, such as a satellite-imaging or a mapping service. In some embodiments, image 500 is a satellite image of the building. In image 500, side 410-1 and line 510 may indicated by the user on the full length of the building. Note that endpoint A of line 510 in image 500 matches endpoints A1 and A2 in image 400, and that endpoint B of line 510 in image 500 matches endpoints B1 and B2 in image 400. Thus, line 510 may be the same as at least one of lines 412.

After the user saves images 400 and 500 with the drawn lines 412 and 510, the satellite-imaging service or the mapping service may provide a distance between endpoints A and B. Based on lines 412 and the distance, side 410-1 is calibrated, such as that the position of every point on side 410-1 is known. Once this calibration is performed for a building, it can be reused to find the height of a small cell in the building. In particular, the measurements during the calculation may define a ration between pixels in image 400 and the numerical distance at one point in image 400 (such as a center of line 412-1). Because the scale changes linearly in all directions, the location (including the height) of another point on surface 410-1 can be determined using a 2D geometric calculation.

Figure 6:
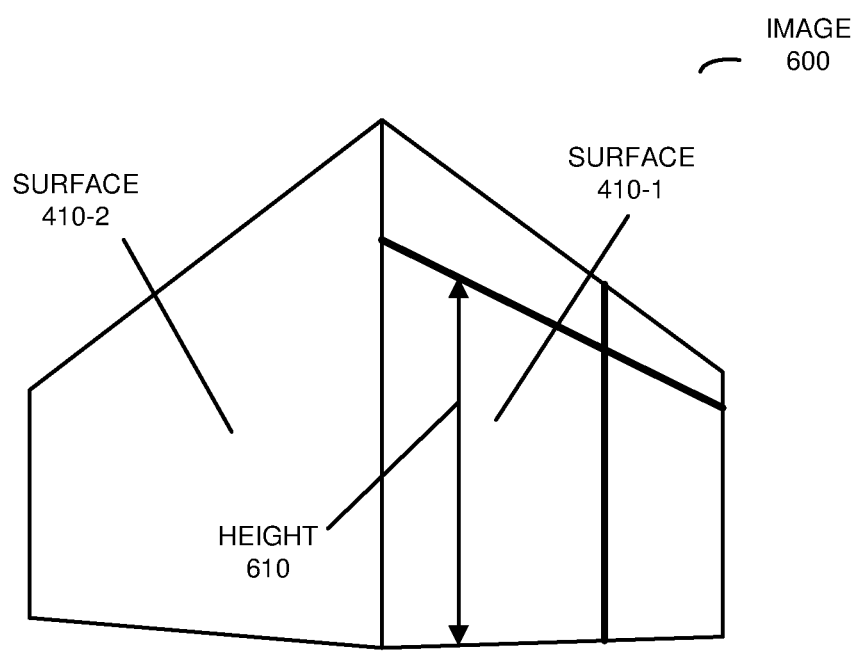
FIG. 6 is a drawing illustrating determining of a height of a transceiver in a structure in accordance with an embodiment of the present disclosure.

The determination of the height of a small cell in the building is illustrated in FIG. 6, which presents a drawing of an example of determining of a height 610 of a transceiver (such as a small call) in a structure. In particular, the user may use an application (which is sometimes referred to as a 'height-finding tool') executing on the smartphone.

When using the height-finding tool, the user may image 400 of the building where only the calibrated plane of side 410-1 is enabled (not greyed out). When the user moves a mouse or their finger over the enabled area, height 610 from ground level may be indicated.

If the user is unsure from the outside of the building exactly the small cell is located inside the building, the user may identify a point inside the building (which is sometimes referred to as a 'mark') that is also visible from the outside. For example, the mark may be the top line of a window. Using the height-finding tool, the user can determine the height of the marker. Then, the user can measure inside the building the height difference (such as 0.5 ft) between the mark and the small cell. Next, the user can add the height difference to the height of the mark to determine the height of the small cell. Note that, if a building is covered completely with windows, such that, from the inside, the user cannot see the top of the windows, then the user may need to create the mark. For example, the user may put a visible mark (such as a flashlight) against the window before taking the building photograph.

While the preceding examples illustrated the measurement technique with straight, vertically aligned, horizontal lines 412, in other embodiments the lines may partially overlap and/or may not be horizontal. Moreover, in some embodiments the lines are curved (such as if a wide-angle lens is used to acquire image 400).

We now describe embodiments of an electronic device, which may perform at least some of the operations in the measurement technique. FIG. 7 presents a block diagram illustrating an electronic device 700 in accordance with some embodiments, such as one of: transceiver 110, electronic device 112, imaging service 114, computer 116, optional access point 118 and/or optional base station 120. This electronic device includes processing subsystem 710, memory subsystem 712, networking subsystem 714, imaging subsystem 730 and user-interface subsystem 732. Processing subsystem 710 includes one or more devices configured to perform computational operations. For example, processing subsystem 710 can include one or more microprocessors, ASICs, microcontrollers, programmable-logic devices, and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), and/or other types of memory. In some embodiments, instructions for processing subsystem 710 in memory subsystem 712 include: one or more program modules or sets of instructions (such as program module 722 or operating system 724), which may be executed by processing subsystem 710. Note that the one or more computer programs or program modules may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720 (or antenna elements). (While FIG. 7 includes one or more antennas 720, in some embodiments electronic device 700 includes one or more nodes, such as nodes 708, e.g., a pad, which can be coupled to the one or more antennas 720. Thus, electronic device 700 may or may not include the one or more antennas 720. Note that the one or more nodes 708 may include one or more input node(s) to and/or one or more output node(s) from electronic device 700.) For example, networking subsystem 714 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 700 may be adapted or changed using pattern shapers (such as reflectors) in one or more antennas 720 (or antenna elements), which can be independently and selectively electrically coupled to ground to steer the transmit antenna pattern in different directions. Thus, if one or more antennas 720 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 700 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting advertising or beacon frames and/or scanning for advertising frames transmitted by other electronic devices as described previously.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Moreover, electronic device 700 may include imaging subsystem 730, which may include an imaging sensor (such as a CMOS or a CCD sensor) for acquiring one or more images. Furthermore, electronic device 700 may include user-interface subsystem 732 (such as a keyboard, a mouse, a touchpad, a microphone and a voice-recognition technique, etc.) to allow information to be provided to a user of electronic device (such as via a user interface displayed on the display in or associated with display subsystem 726), and to be received from the user (such as user-input information).

Electronic device 700 can be (or can be included in) any electronic device with at least one network interface. For example, electronic device 700 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program module 722 is included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 714. The integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and a packet-based communication protocol as illustrative examples, in other embodiments a wide variety of communication protocols and, more generally, wireless communication techniques may be used. Thus, the measurement technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the measurement technique may be implemented using program module 722, operating system 724 (such as a driver for interface circuit 718) or in firmware in interface circuit 718. Alternatively or additionally, at least some of the operations in the measurement technique may be implemented in a physical layer, such as hardware in interface circuit 718.

Moreover, while the preceding embodiments illustrated the measurement technique in which electronic device 112 (FIG. 1) provides or receives a frame or a packet from another electronic device in system 100 (FIG. 1), in some embodiments electronic device 112 (FIG. 1) may concurrently receive frames or packets from two or more electronic devices. For example, the communication protocol may use orthogonal frequency division multiple access (OFDMA).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A method for determining a height of a transceiver in a structure, comprising:
   by an electronic device:
   acquiring an image of a surface of the structure;
   displaying the image;
   receiving user-input information that specifies a first line and a second line on the surface of the structure, wherein the first line and the second line are vertically offset from each other;
   receiving second user-input information that specifies an approximate vertical location on an exterior of the structure of the transceiver in the structure;
   providing, to an output node of the electronic device, a query for a second image of the structure;
   receiving, from an input node of the electronic device, the second image, wherein the second image includes a view of the structure from a position above the structure;
   displaying the second image;
   receiving third user-input information that specifies at least one of the first line and the second line on the surface in the second image;
   providing, to the output node and based on the third user-input information, information that specifies at least locations of end points of at least one of the first line and the second line;
   receiving, from the input node, a distance between the end points;
   providing, to the output node, the distance, the approximate vertical location and a geometry of the first line and a second line; and
   receiving, from the input node, the determined height of the transceiver.

2. The method of claim 1, wherein the method further comprises transmitting, to the output node, the determined height for the transceiver.

3. The method of claim 1, wherein the first line and the second line are horizontal lines with slopes of zero.

4. The method of claim 1, wherein pairs of end points of the first line and the second line are vertically aligned.

5. The method of claim 1, wherein the image includes a two-dimensional view of the structure.

6. The method of claim 1, wherein the view includes an oblique perspective of the structure that includes two surfaces of the structure.

7. The method of claim 1, wherein the first line and the second line at least partially overlap in the second image.

8. The method of claim 1, wherein the query includes a location of the structure.

9. The method of claim 1, wherein the height has an uncertainty that is less than a predefined value.

10. An electronic device, comprising:
    an imaging sensor configured to acquire an image;
    an interface circuit configured to communicate with other electronic devices;
    a display configured to display information;
    a processor coupled to the imaging sensor, the interface circuit, the display and memory; and
    the memory configured to store a program module, wherein, when executed by the processor, the program module causes the electronic device to:
    acquire, using the imaging sensor, an image of a surface of a structure;
    display, on the display, the image;
    receive user-input information that specifies a first line and a second line on the surface of the structure, wherein the first line and the second line are vertically offset from each other;
    receive second user-input information that specifies an approximate vertical location on an exterior of the structure of a transceiver in the structure;
    provide, to an output node of the electronic device, a query for a second image of the structure;
    receive, from an input node of the electronic device, the second image, wherein the second image includes a view of the structure from a position above the structure;
    display, on the display, the second image;
    receive third user-input information that specifies at least one of the first line and the second line on the surface in the second image;
    provide, to the output node and based on the third user-input information, information that specifies at least locations of end points of at least one of the first line and the second line;
    receive, from the input node, a distance between the end points;
    provide, to the output node, the distance, the approximate vertical location and a geometry of the first line and a second line; and
    receive, from the input node, the determined height of the transceiver.

11. The electronic device of claim 10, wherein, when executed by the processor, the program module causes the electronic device to transmit, to the output node, the determined height for the transceiver.

12. The electronic device of claim 10, wherein the first line and the second line are horizontal lines with slopes of zero.

13. The electronic device of claim 10, wherein pairs of end points of the first line and the second line are vertically aligned.

14. The electronic device of claim 10, wherein the query includes a location of the structure.

15. The electronic device of claim 10, wherein the height has an uncertainty that is less than a predefined value.

16. A non-transitory computer-readable storage medium for use in conjunction with an electronic device, the computer-readable storage medium storing a program module that, when executed by the electronic device, causes the electronic device to determine a height of a transceiver in a structure by performing at least the operations of:

acquiring an image of a surface of the structure;

displaying the image;

receiving user-input information that specifies a first line and a second line on the surface of the structure, wherein the first line and the second line are vertically offset from each other;

receiving second user-input information that specifies an approximate vertical location on an exterior of the structure of the transceiver in the structure;

providing, to an output node of the electronic device, a query for a second image of the structure;

receiving, from an input node of the electronic device, the second image, wherein the second image includes a view of the structure from a position above the structure;

displaying the second image;

receiving third user-input information that specifies at least one of the first line and the second line on the surface in the second image;

providing, to the output node and based on the third user-input information, information that specifies at least locations of end points of at least one of the first line and the second line;

receiving, from the input node, a distance between the end points;

providing, to the output node, the distance, the approximate vertical location and a geometry of the first line and a second line; and receiving, from the input node, the determined height of the transceiver.

17. The computer-readable storage medium of claim 16, wherein, when executed by the electronic device, the program module causes the electronic device to transmit, to the output node, the determined height for the transceiver.

18. The computer-readable storage medium of claim 16, wherein the first line and the second line are horizontal lines with slopes of zero.

19. The computer-readable storage medium of claim 16, wherein pairs of end points of the first line and the second line are vertically aligned.

20. The computer-readable storage medium of claim 16, wherein the query includes a location of the structure.

\* \* \* \* \*